United States Patent [19]

Oswald

[11] 3,717,618
[45] Feb. 20, 1973

[54] TERMINALLY DIFUNCTIONAL POLYTHIOETHERS DERIVED VIA DITHIOL-ACETYLENE POLYADDITIONS

[75] Inventor: Alexis A. Oswald, Mountainside, N.J.

[73] Assignee: Esso Research and Engineering Company, Linden, N.J.

[22] Filed: June 17, 1970

[21] Appl. No.: 47,109

Related U.S. Application Data

[63] Continuation-in-part of Ser. No. 541,696, April 11, 1966, Pat. No. 3,592,798.

[52] U.S. Cl..........260/887, 204/159.22, 260/28.5 R, 260/31.8 Z, 260/41 R, 260/77.5 CR, 260/79, 260/79.5 R, 260/79.5 C, 260/79.7, 260/609 B, 260/888
[51] Int. Cl..............................................C08d 9/08
[58] Field of Search..........260/79, 79.7, 79.5, 609 B, 260/79.5 C; 204/159.22

[56] References Cited

UNITED STATES PATENTS 3,484,418    12/1969    Vandenberg..........................260/79
3,503,940    3/1970    Oswald..............................260/79.7
3,403,187    9/1968    Oswald et al........................260/609
3,488,270    1/1970    Griesbaum et al...................204/162
3,466,336    9/1969    Mueller et al.......................260/609
3,454,539    7/1969    Greenlee..............................260/79
2,505,366    4/1950    Schoene..............................260/79.3

*Primary Examiner*—Donald E. Czaja
*Assistant Examiner*—M. I. Marquis
*Attorney*—Chasan and Sinnock and Anthony Lagani, Jr.

[57]         ABSTRACT

Terminally difunctional polythioether polyadducts are prepared by reacting dithiols with acetylenes under free radi-cal conditions. Inherent to their method of preparation, the novel polythioethers contain the divalent carbon skeletons derived from their dithiol and acetylene monomer components in a regularly alternating manner. Dependent on dithiol acetylene monomer ratio, the novel polymers contain thiol and/or vinyl sulfide end groups. Owing to their reactive, diterminal functions, they can be chain extended and crosslinked via known reactions to elastomers useful as mastics.

14 Claims, No Drawings

TERMINALLY DIFUNCTIONAL POLYTHIOETHERS DERIVED VIA DITHIOL-ACETYLENE POLYADDITIONS

CROSS-REFERENCE TO RELATED APPLICATIONS

This application is a continuation-in-part of U.S. application Ser. No. 541,696, filed Apr. 11, 1966 now U.S. Pat. No. 3,592,798.

BACKGROUND OF THE INVENTION

Polythioethers of high molecular weight are a widely investigated useful class of polymers. Most high molecular weight polythioethers have been prepared by the anionic polymerization of episulfides. With the exception of the highly crystalline polyethylene-sulfide, these polymers are useful as elastomers. These elastomers are generally copolymers. Minor amounts of olefinic unsaturation is incorporated into the polymer chain as crosslinking sites. This unsaturation is derived from an unsaturated episulfide comonomer.

The successful crosslinking of high molecular weight unsaturated episulfide copolymers initiated further research to find novel types of reactive polythioethers which can be crosslinked to rubbery networks. Such rubbers are of high interest mainly because their high sulfur content results in very good hydrocarbon solvent resistance and excellent aging characteristics.

The preparation of some terminally difunctional polythioethers by the addition of dithiols to diolefinic hydrocarbons has been known for some time. For example, Marvel and Chambers, J. Am. Chem. Soc. 70, 999 (1948) and Marvel and Cripps, J. Polymer Sci. 8, 313 (1952) reported the reaction of dithiols with conjugated dienes such as butadiene and with dienes having isolated double bonds. However, such reactions proceeded at very slow rates and often resulted in unsaturated thioethers.

Numerous polythioethers were prepared by the ring opening of episulfides. The terminal groups of these polymers were generally not disclosed. However, they can be inferred on the basis of the initiators used since the mechanism of such ring opening reactions is known. It can be safely assumed that these polythioether preparations did not result in diterminally thiol and/or vinyl sulfide functional polymers. Inherent to the episulfide ring opening catalysts used, in general polythioethers containing only one thiol and no vinylic sulfide groups were formed. The other end group derived from the initiator was usually a non-reactive hydrocarbon end group. For example, Boileau produced naphthyl terminated polythioether thiols by using sodium naphthyl as an initiator as described in the journal Compt. rend. (Paris) 254, 2774 (1962). Another example is given by the ethyl terminated polythioether thiol polymers which were produced by zinc diethyl initiator as disclosed in U.S. Pat. No. 3,222,326, incorporated herein by reference.

The use of amines as initiators of episulfide polymerization resulted in polyfunctional polythioethers. However, their use also resulted in the incorporation of nitrogen into the polymer (see, for example, U.S. Pat. No. 3,325,456).

Some polythioethers having reactive thiol end groups are disclosed in U.S. Pat. No. 3,337,487, incorporated herein by reference. These polythioethers result from the cleavage of non-functional very high molecular weight polymers derived by episulfide polymerization. Since episulfides such as ethylene and propylene episulfide cannot be copolymerized in an alternating manner, the method disclosed results in thiol terminated copolymers having a random structure.

SUMMARY OF INVENTION

Polythioethers having utility as mastics, sealants and potting compounds are prepared by reacting an acetylenic compound with a dithiol. The polymers so formed are rubbery or crystalline depending on the structure of the dithiol and acetylenic compound.

The polythioethers of this invention have the general formula

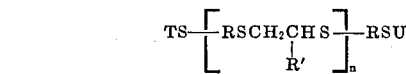

wherein R is a $C_2$—$C_{30}$ divalent organic radical; R' is H or a $C_1$—$C_{30}$ hydrocarbyl radical; T and U are independently selected from the group consisting of H, —CH=CHR' and mixtures thereof and $n$ varies from 1 to 1000.

The preferred products of this invention are essentially colorless liquids or low melting solids having a number average molecular weight of about 200 to 200,000. They are readily crosslinked and chain extended by conventional methods.

DETAILED DESCRIPTION

A process for preparing polythioethers having thiol or vinylic terminal functionality is described in copending U.S. application Ser. No. 541,696, now U.S. Pat. No. 3,592,798 incorporated herein by reference. The process involves the free radical addition of dithiols to acetylenic compounds. The structure of the resulting polythioether is dependent on the structure of the thiol and acetylenic compounds from which they are derived. Due to the nature of the reaction mechanism, the compounds so formed have incorporated therein the divalent carbon moiety derived from the acetylenic compound and the divalent alkylene bis-thio radical derived from the dithiol in a regular alternating manner.

Hence, the products of this invention have a repeating structure which is broadly described by the general formula

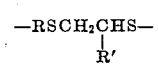

wherein the —SRS— fragment represents the residue derived from the thiol monomer and the

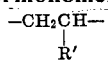

fragment is the residue of the acetylenic compound from which the polymer is prepared.

The dithiols suitable for use in the practice of this invention have the general formula

HSRSH wherein R is a divalent organic radical. Preferably, R is a $C_2$–$C_{30}$ divalent organic radical.

The organic radical may have incorporated into its structure sulfur, oxygen or silicon in addition to carbon and hydrogen. The sulfur and oxygen containing organic radicals may contain thioether, oxyether, ketone and carboxylic ester groups.

Both sulfur and oxygen in either of its forms may be present in the same organic radical.

In its preferred embodiment, the dithiol is a dithiol wherein R is a $C_2$ to $C_{30}$ divalent hydrocarbon radical. The divalent radical may be a saturated radical, e.g., alkylene, an unsaturated radical, e.g., acyclic or alicyclic alkenes or alkynes, a bis-alkylene substituted aromatic radical or an aromatic radical, e.g., m-phenylene.

The divalent alkylene radicals are preferably $C_2$–$C_{18}$ alkylene radicals, more preferably $C_2$–$C_{12}$ alkylene, most preferably $C_2$–$C_4$ alkylene, e.g., trimethylene. Illustrative examples of dithiols of this invention wherein R is a divalent alkylene radical are: ethane dithiol, propane dithiol, butanedithiol, pentanedithiol, hexanedithiol, dodecane dithiol, docosanedithiol, triacontanedithiol, cyclohexane dithiol, cyclododecanedithiol, cyclohexane bis(ethanethiol), etc.

The acyclic or alicyclic alkene dithiols or alkyne dithiols suitable for use in the practice of this invention are internally unsaturated dithiols, preferably $C_4$–$C_{12}$ alkenedithiols, more preferably $C_4$–$C_8$ alkenedithiols. Illustrative examples of dithiols wherein R is an unsaturated divalent radical are 2-butene-1,4-dithiol, 3-hexene-1,6-dithiol, cyclohexene dithiol, 4-octene-1,8-dithiol, 2-butyne-1,4-dithiol, cyclododecene dithiol, 6-docosene-1,12-dithiol and 10-triacontene-1,30-dithiol.

Although the saturated and unsaturated thiols listed above are essentially terminally difunctional thiols, secondary dithiols are also suitable for use in the practice of this invention.

The aromatic compounds suitable for use as the dithiols of this invention are preferably $C_6$ to $C_{30}$ aromatic compounds; preferably these aromatic compounds contain about six to 10 carbon atoms, e.g., eight carbon atoms. Illustrative examples of these aromatic compounds are m-phenylene dithiol, 1,5-naphthylene dithiol, biphenylene dithiol, terphenylene dithiol, quadriphenylene dithiol, xylene dithiol, durene dithiol and t-butyl-benzene dithiol.

The $C_2$–$C_{30}$ divalent organic radicals containing sulfur, oxygen or silicon preferably contain two to 12 carbon atoms, more preferably about four to 10 carbon atoms, most preferably about four to six carbon atoms. Illustrative examples of such organic dithiols suitable for use in the practice of this invention are thio-bis-ethanethiol, ethylene bis(oxyethanethiol), thio-bis-benzene-thiol, ethylene-bis-carboxyethanethiol, 3-hydroxy-propanedithiol, oxo-bis-(propyloxypropanethiol), terephthaloyl-bis(methanethiol), dimethylsylyl-bis(ethanethiol) and diphenylsylyl-bis(ethanethiol).

Particularly preferred thiols are those compounds wherein R is a $C_2$–$C_4$ alkylene radical since such materials are especially reactive and yield polymers of outstanding resistance to autoxidation and hydrocarbon solvents.

The acetylenic compounds useful as starting materials have the general formula:

$$CH \equiv CR'$$

wherein R' is a hydrogen radical or a $C_1$–$C_{30}$ hydrocarbon radical. Preferably, R' is (1) H; (2) a $C_1$–$C_{30}$ alkyl group, e.g. methyl, ethyl, etc.; (3) a $C_2$–$C_{20}$ alkenyl radical such as vinyl, allyl, etc.; (4) a $C_2$–$C_{30}$ alkynyl radical, e.g. ethynyl, and (5) a $C_7$–$C_{20}$ aralkyl radical such as benzyl, phenylethyl, naphthyl, methyl.

Where R' is H, the compound is obviously acetylene. Preferably, R' is a hydrocarbyl radical.

Where the hydrocarbyl radical is an alkyl group, it preferably comprises a $C_1$ to $C_{10}$ alkyl radical; more preferably $C_1$–$C_6$, most preferably $C_1$–$C_4$. R' may be cycloalkyl. Illustrative examples of such alkyl radicals are methyl, propyl, hexyl, octyl, dodecyl, eicosyl, docosyl, triacontyl and cyclohexyl.

Where the hydrocarbyl radical is an alkenyl radical, it is preferably an internally unsaturated $C_4$–$C_{10}$ radical. Illustrative examples of such alkenyl radicals are 2-butenyl, 3-hexenyl, cyclohexenyl, 4-octenyl, cyclododecenyl, docosenyl, triacontenyl, etc.

The hydrocarbyl alkynyl radicals are preferably internally unsaturated radicals, more preferably $C_4$ to $C_8$ alkynyl radicals such as 3-hexynyl and triacontynyl.

Where R' is an aralkyl, it is preferably a $C_7$ to $C_{10}$ aralkyl. Illustrative of aralkyl radicals contemplated in the practice of this invention are benzyl, phenylethyl, naphthyl methyl, phenyloctyl and phenyldocosyl.

In its preferred embodiment, R' is a hydrocarbyl radical of less than 10 carbon atoms. The preferred acetylenic compounds are those compounds in which R' is a $C_1$ to $C_6$ hydrocarbyl radical, more preferably, a $C_1$–$C_4$ alkyl radical. The preferred acetylenic compounds are acetylene, methylacetylene, butylacetylene and benzylacetylene.

The reactions by which the products of this invention are prepared are represented by the following equations:

(1) 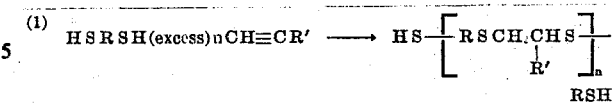

(2) $n+1 HSRSH + n+1 CH \equiv CR' \longrightarrow$

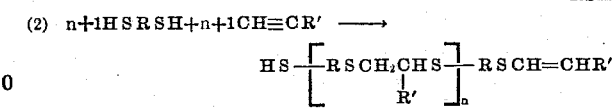

(3) $n+1 HSRSH + n+2 CH \equiv CR' \longrightarrow$

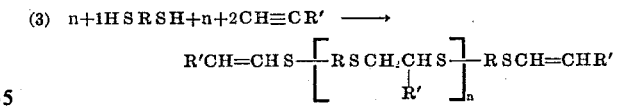

The product of reaction (1) is the predominant reaction product where either equimolar or excess amounts of dithiol compounds are used in relation to the amount of acetylenic compound. Minor amounts of the product of equation (2) are secured wherein equimolar or slight excess amounts of acetylenic compound are used. Where a large excess of acetylenic compound is used, the predominant product is the product of equation (3).

The preferred products are essentially colorless liquid or low melting solids having a number average molecular weight of about 200 to 200,000, preferably about 500 to 20,000. Hence, "n" may vary from about 1 to about 1,000 preferably 2 to 1,000, more preferably "n" is about 2 to about 100, most preferably, 3 to 40. The liquid polythioether products are particularly preferred in mastics and sealants. Such liquid adducts are essentially castable rubbers.

The liquid state of the polythioethers is strongly dependent on their structure. The tendency toward crystallinity is increased through the introduction of branching, e.g. R' ≠ H and selecting R so that it is greater than a $C_2$ divalent carbon radical. It is well known that increasing the distance between subsequent sulfur atoms in a polythioether reduces crystallinity.

The products of this invention are broadly defined by the general formula

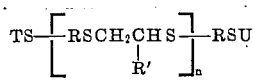

where R and R' are as previously defined, T and U are independently selected from the group consisting of H and

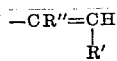

and n is about 1 to about 1,000. Preferably, R'' is H. Where at least one member of the group T and U is H, R must not be

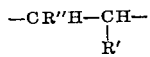

For example, where R'' is H and R' is methyl, R may not be

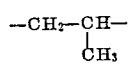

In a more specific embodiment of this invention, R is a divalent alkylene radical of the formula $-C_xH_{2x}-$ and R' is $+C_yH_{2y+1}+$ wherein x is 2 to 30, preferably 2 to 12, more preferably 2 to 4, e.g. 3; and y is 0 to 30, preferably 0 to 4. It is obvious that where y is 0 $+C_yH_{2y+1}+$ is H, otherwise the formula denotes an alkyl radical.

In another specific embodiment, R is more simply — $(CH_2)_x-$ and R' is $-(C_yH_{2y+1})-$ x and y being as previously defined.

The terminally difunctional polythioether compounds of this invention can be defined as thiol and/or vinyl sulfide terminated difunctional polythioether polyadducts. The preferred products are the dithiol terminated adducts.

The ratio of reactants present in the reaction zone has a strong effect upon the molecular weight of the final product. In general polymers having a number average molecular weight between 500 and 4000 are secured when an equal molar ratio of dithiol to acetylenic compound is present in the reaction zone. Higher molecular weight thiol terminated polythioethers are secured when the molar ratio of thiol compound to acetylenic compound is maintained between about 1:1.01 to 1:1.3.

The desirable amount of excess acetylene is dependent on the conversion of the reactants. For example, in the case of long reaction times resulting in high conversions a smaller excess of the acetylene is recommended to obtain higher molecular weights than at lower conversions. The desirability of excess acetylene is also dependent on the type of the dithiol reactant used. Aliphatic dithiols which have a tendency to form thiol terminated polythioethers are preferably reacted with excess acetylene to obtain higher molecular weights. Aromatic dithiols which produce polythioethers having vinylic sulfide functionality do not require an acetylene excess.

It is believed that the effect of acetylene excess is partially dependent on the relative rates of the addition reactions of the two types of polymer end groups. These reactions are shown by the following schemes:

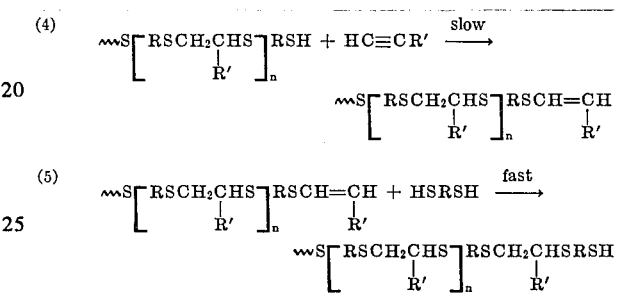

Since reaction (4) involving the acetylene is much slower than a reaction (5) involving the corresponding vinylic sulfide, a definite excess of the acetylene is beneficial for obtaining higher molecular weight products.

It was found that the use of a high excess of the dithiol compound in the reaction drastically reduces the molecular weight. For example, the reaction of two moles of a dithiol with one mole of an acetylene yields a bis-thioether dithiol and a tris-thioether-dithiol as the main polyadduct:

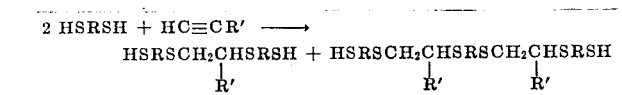

Although the direct use of the above compounds for the preparation of polymer articles is not commercially attractive, they can be advantageously used for the preparation of higher molecular weight polythioether-dithiols by reacting them with further amounts of an acetylene in the next step. For example:

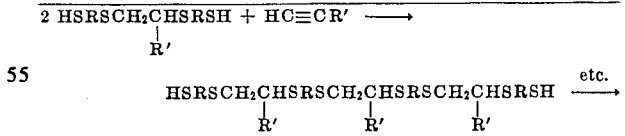

The reaction for the production of the thiol compounds of the present invention can be carried out in bulk, in the presence of inert solvents, or with the use of water emulsion techniques. Low molecular weight polythioether compounds suitable as the base component in a mastic composition can be prepared most efficiently using bulk polymerization techniques, that is, carrying out the addition reaction in the absence of solvents. When higher molecular weight materials are desired, the addition reaction is preferably carried out in the presence of an inert solvent; however, high molecular weight materials can also be secured if the reaction is carried out in a typical water-surfactant emulsion system.

Useful inert solvents include saturated aliphatic hydrocarbons, halogenated saturated aliphatic hydrocarbons, aliphatic ethers, and aliphatic thioethers such as pentane, cyclohexane, dimethyl sulfide, diethyl disulfide, etc. The use of aromatic hydrocarbons as solvents usually results in sharply reduced reaction rates and sometimes leads to undesirable side reactions.

The conditions at which the addition reaction is conducted can vary over a wide range. The temperature and pressure within the reaction zone should be adjusted such that the dithiol and acetylenic compounds are in the liquid state during reaction. For bulk addition reactions, temperatures varying from −100° C. to 175° C., preferably −30° to 140° C. can be used. When the polythioethers are formed in the presence of a solvent, temperatures varying from −30° to +140° C., preferably from 0° to 50° C. are used. When emulsion techniques are utilized, the reaction should be conducted at temperatures varying from 0° to 50° C.

The addition reaction is not critically sensitive to pressure provided that the reaction pressure is sufficient to maintain the reactants in the liquid state at the temperatures of reaction. In general, pressures ranging from 0.5 to 10 atmospheres, preferably from 1 to 5 atmospheres, can be used. In most industrial applications, the pressure within the reaction zone will normally be the autogenous pressures exerted by the reactants.

The reaction time used in the formation of the polymers of this invention is not critical; however, sufficient time should be allowed for the desired monomer conversion which depends upon temperature, reactant concentration, activity of catalyst used, etc. High yields of polythioethers are secured within the temperature and pressure limits set forth above within from 1 to 300 hours.

While not absolutely essential to the process, it is desirable to employ a free radical initiator in the reaction. Radiation such as ultraviolet light, gamma-radiation or heat may be applied to the reactants to promote the addition reaction. Additionally, chemical initiators such as peroxides, azo compounds, etc., may also be used instead of radiation or in combination with it. Ultraviolet and gamma radiation are the preferred initiators for this process although peroxidic initiators such as t-butyl hydroperoxide, bis-t-butyl peroxide, as well as materials such as bis-azobutyronitrile can also be used.

The reaction vessel utilized for the addition reaction can be constructed of any material that is inert to the reactants and catalyst used and is capable of withstanding the operating pressures. Reaction vessels made of stainless steel and glass-lined steel are satisfactory.

A preferred embodiment of the novel compositions includes polythioetherdithiols of the formula:

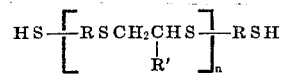

wherein R and R' are as previously defined and

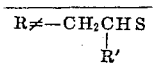

More preferably such polythioetherdithiols include those of the formula:

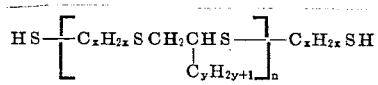

wherein $x$, $y$ and $n$ are as defined earlier and $-C_xH_{2x}-$ does not equal $-CH_2CH(C_yH_{2y+1})-$.

Further illustrative examples of polythioetherdithiols of this invention are:

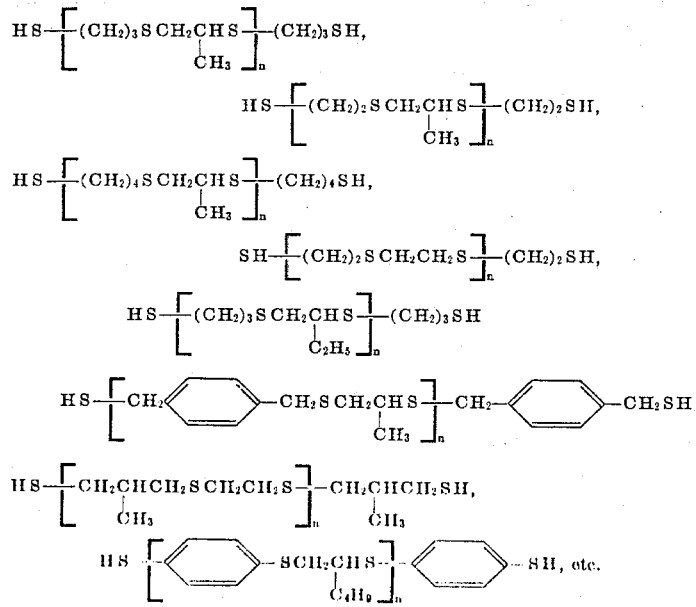

Another specific embodiment of the novel compositions includes diterminally functional polythioethers having one thiol and vinyl sulfide end group of the following formula:

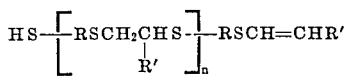

wherein R and R' are as previously defined with the limitation that

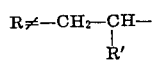

Although the addition products of the present invention have many uses as intermediates because of the thiol or vinyl terminal functionality present on the polymers, they find particular utility as the base substituent for mastic compositions. The thiol terminated addition products of this invention can be readily crosslinked to stable rubbery three-dimensional networks using a variety of techniques.

For example, the polythioetherdithiol addition products may be oxidatively chain extended by mixing the polymers with from 1 to 20 grams per 100 grams of polymer of dimethylsulfoxide and heating the total mixture at a temperature varying from 80° to 150° C. for a period ranging from 1 to 5 hours.

In another example, 5 parts of the polythioetherdithiol is mixed with 2 parts of a curing composition containing 50 percent of lead dioxide as an oxidizer, 5 percent stearic acid as a retarder and 45 percent dibutyl phthalate as a plasticizer. About 2.5 grams of carbon black of Thermax brand is also added as a filler. Dependent on the thiol functionality curing occurred in about 24 to 36 hours when the mixtures were allowed to stand at room temperature in a desiccator containing a saturated solution of aqueous sodium thiocyanate. Other metal peroxides, sulfur and organic peroxides can be also used for oxidative crosslinking.

For the oxidative crosslinking of polythioetherdithiols the addition of minor amounts of polythiols, e.g., trithiols and tetrathiols is necessary. The oxidation of dithiols results in chain extension while the polythiols contribute to crosslinking as indicated by the following reaction scheme:

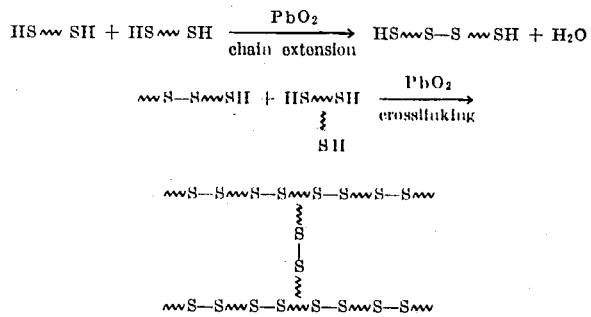

Dependent on the amount and functionality of the polythiol component vulcanized networks of various crosslink densities can be obtained. Suitable polythiols are 1,2,3-propanetrithiol, the trithiol adduct of $H_2S$ and trivinylcyclohexane, benzenetetrathiol, etc.

As another example of curing methods, polythioetherdithiols are treated with epoxides having at least 2 epoxide groups per molecule in the presence of a base catalyst usually an amine. For example, 1.2 mole equivalent of Epon-830, a bis-phenol-A-diglycydyl ether resin, is reacted with 1.0 mole equivalent of a polythioetherdithiol in the presence of 5 wt. percent DMP-30 amine catalyst, i.e. tri-2,4,6-(dimethylaminomethyl)phenol. Chain extension takes place at room temperature due to the thiolepoxide reaction. The cure is completed in two hours at 100° due to the reaction of the hydroxy groups formed with the excess epoxide. The type of reactions involved are indicated by the following reaction scheme:

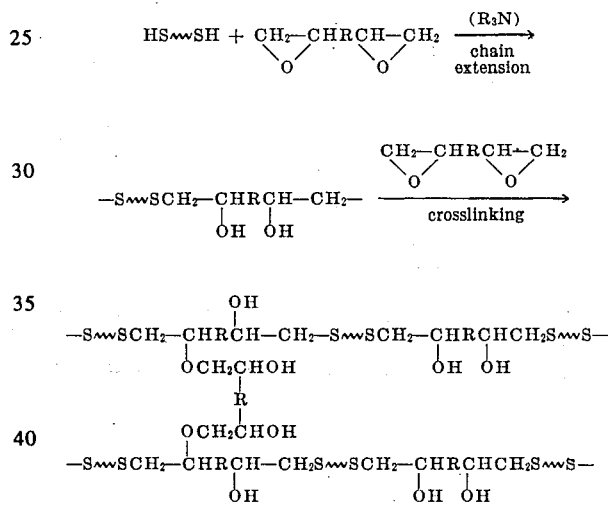

Polythioetherdithiols undergo similar amine catalyzed reactions with diepisulfides. These reactions, however, do not require heating for complete cures, since chain extension and crosslinking both occur under mild conditions.

Alternatively, the polythioetherdithiols can be cured with about equimolar amounts or an excess of a diisocyanate to produce polythiourethanes. It is particularly advantageous to modify the polythioetherdithiol with an equivalent amount of a monoepoxide at first and then crosslink the resulting polythioetherdiol with a diisocyanate. As it is shown by the following reaction scheme such a reaction produces more stable polyurethanes rather than the less stable polythiourethanes. Such reactions can be also effectively catalyzed by tertiary amines.

Polythioetherdithiols can be also chain extended and crosslinked by reacting them with di- and polyolefinic and polyacetylenic unsaturates. It is preferable to use unsaturated compounds having olefinic bonds ac-

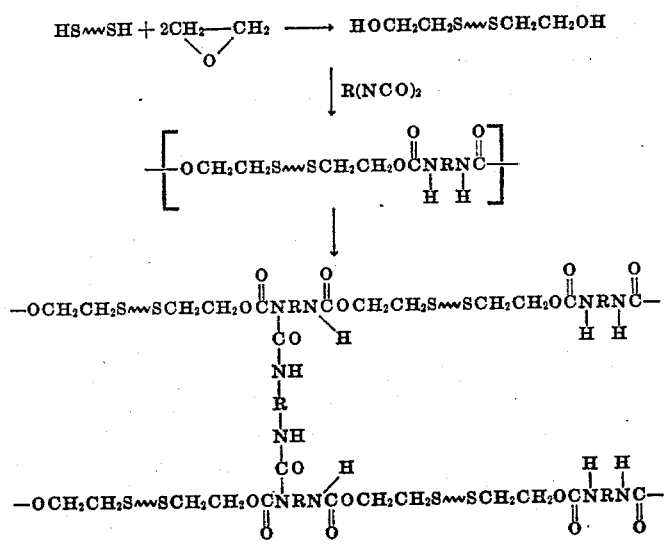

tivated towards thiol addition. For chain extension diunsaturated compounds such as diacrylates, diacrylamides, dipropiolates, diallyl maleate, divinyl sulfone can be advantageously used, e.g.

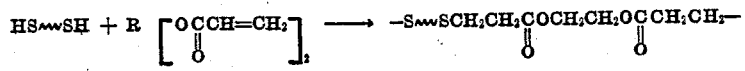

For crosslinking, tri- or polyfunctional unsaturated compounds can be used, alone or in addition to a diunsaturate. Examples of the types of such suitable crosslinking reagents are triacrylates, triacrylamides, tripropiolates, tetraacrylamides. Cross-linking reactions with these reagents can be catalyzed with bases such as tertiary amines.

Unsaturated polymers such as polybutadiene, polyisoprene, butadiene-styrene copolymer, piperylene-isobutylene copolymer, i.e. the types of polymers described in U.S. Pat. Nos. 2,712,562, 2,791,618, 2,849,510 and 2,826,618 can be also reacted with the thiol terminated polymers of this invention. Conversely, the polythioethers having vinyl sulfide end groups can be reacted with tri- and/or polythiols such as the trithiolic ester derived from mercaptopropionic acid and trimethylolpropane. Such crosslinking reactions can be initiated by radical type chemical initiators such as azo-bis-isobutyronitrile and radiation such as ultraviolet light.

The crosslinking reaction of unsaturated polymers with polythioether dithiols has advantages beyond producing more solvent resistant networks. In the case of unsaturated high polymers, the lower molecular weight polythioetherdithiols act as crosslinking agents; e.g.

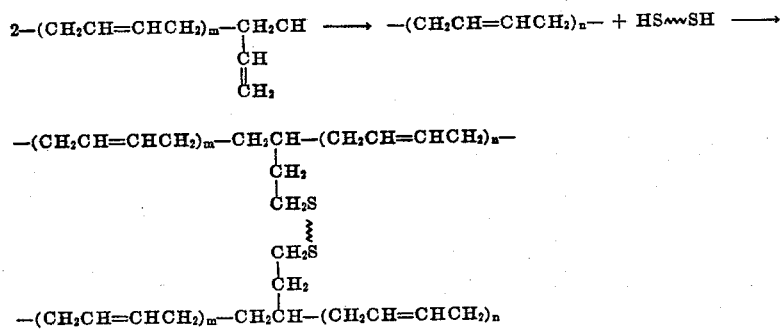

Crosslinking by branched polythioetherdithiols provides a highly elastic polymer link. As such, this link is more stable than comparable polysulfide links and therefore free from relaxation problems. Furthermore, the present polymers may act as built in plasticizers and stabilizers.

The above advantageous effect can be often also achieved by mechanically mixing our polymers with other polymers such as polyolefins such as polyethylene, polypropylene, polyvinylchloride, ethylene-propylene copolymer, etc. Such blends can be advantageous because of their increased oxidation stability, particularly in the presence of phenolic inhibitors.

In such blends, the terminally vinyl and/or thiol functional polythioether is usually a minor component. It is preferable to use it in amounts less than 25 wt. percent, more preferably between 0.05 and 10 wt. percent.

Our terminally difunctional polymers can be also blended with asphalt and vulcanized thereafter. In such blends either the asphalt or the polythioether can be the major component although it is preferred to have major amounts of the asphalt.

Prior to curing operations, the addition products may be compounded with stabilizers, plasticizers or extender oils, asphalts and various types of fillers. For example, carbon black, petroleum, coke or mineral fillers may be incorporated into the polymer up to about 10 parts, preferably up to 200 parts, of filler per 100 parts of polymer. Among the carbon blacks that may be compounded with the addition product polymer are the channel blacks such as ETC, MPC, HPC, etc. (these letters denoting carbon black products well known to the trade), the furnace blacks including SRF, HAF, etc., and the thermal blacks. The mineral fillers which may be used include any of the usual noncarbon black fillers or pigments such as the oxides, hydroxides, sulfides, carbonates, and so forth of silicon, aluminum, magnesium, titanium, zinc or the like, or the silicates or aluminates of the various elements above-indicated.

The cured mastic compositions of this invention are highly resistant to ozone and oxygen degradation even at elevated temperatures and are relatively immune to attack by organic solvents. Hence, the cured materials find particular utility in automotive applications and as gasketing materials.

The invention will be further understood by reference to the following examples.

EXAMPLE 1

One gram mole (108 grams) of trimethylenedithiol was placed in a quartz pressure tube equipped with a magnetic stirrer. The tube was evacuated and 40 grams (1 gram mole) of methylacetylene was condensed therein. The reaction vessel was closed, placed in a water bath maintained at a temperature varying between 15° and 17° C., and the contents irradiated with constant stirring with a 70 watt high pressure Hanau immersion lamp. After a reaction period of 11 hours wherein the reactants were constantly agitated and subjected to ultraviolet irradiation, the reaction vessel was opened and the addition product recovered. All of the volatile starting materials and most of the volatile products were removed from the product by bubbling nitrogen for one hour through the product contained in a vessel maintained at a temperature of 150° C. and 25 millimeters of mercury. Following the distillation procedure, 134 grams (94 percent yield) of a polythioetherdithiol was obtained as clear, colorless, viscous liquid product.

Nuclear magnetic resonance analysis (NMR) of the product showed the presence of characteristic triplets centered at about 2.64 p.p.m. downfield from tetramethylsilane for the alpha-methylene, $SCH_2$, group; a characteristic quintriplet centered at about 1.74 p.p.m. for the middle methylene, $CH_2$, group; and a typical doublet at 1.34 p.p.m. for the methyl group. The lack of vinylic proton signals in the NMR spectrum indicated that the polythioether was saturated. The presence of the thiol groups was confirmed by potentiometric titration of the product with silver nitrate. The average molecular weight of the product as determined by low pressure osmometry in benzene solution was 1112.

On the basis of NMR analysis and molecular weight determination, the product is believed to have the following structure:

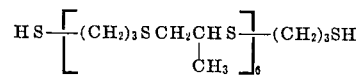

An elemental analysis of the product also supported the assumed structure. The calculated elemental composition for $HS[(CH_2)_3SCH_2CH(CH_3)S]_6(CH_2)_3SH$ (calculated molecular weight 1146): C, 47.15; H, 8.09; S, 44.76. Found: C, 47.70; H, 8.15; S, 44.91.

EXAMPLE 2

Following the procedure of Example 1, one gram mole (94 grams) of ethanedithiol was reacted with 40 grams (1 gram mole) of methylacetylene for 33.5 hours. After heating the crude product to 175° C. at 0.3 millimeters of mercury to remove the volatile reactants and products, 129 grams (96 percent yield) of viscous liquid polymeric product was recovered. The average molecular weight of the polymer as determined by low temperature osmometry in benzene solution was found to be 2532. From the molecular weight determination and an NMR structure analysis, the principal product was believed to have the following structural formula:

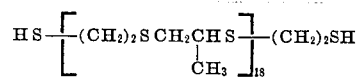

An elemental analysis of the product also supported the assumed structure. The calculated elemental composition for $C_{92}H_{186}S_{38}$ (molecular weight 2511; $n = 18$): C, 44.01; H, 7.46; S, 48.53. Found: C, 44.15; H, 7.52; S, 48.73.

EXAMPLE 3

Following the procedure of Example 1, 108 grams (1 gram mole) of 1,2-propane dithiol was reacted for 48 hours with 40 grams (1 gram mole) of methylacetylene. Following the reaction, the unreacted reagents and volatile adducts were removed by a one-hour distillation at 150° C. The final polythioetherdithiol product weighed 126 grams (85 percent yield). Its molecular weight was found to be 1604. The calculated composition for $C_{63}H_{128}S_{22}$ (molecular weight 1591): C, 47.56; H, 8.10; S, 44.34. Found: C, 47.36; H, 8.33; S, 43.79.

EXAMPLE 4

One-fifth molar quantities (21.6 grams each) of trimethylenedithiol were reacted with varying amounts of methyl-acetylene starting with an equal molar amount (8 grams) and with amounts in excess of equal molar quantities up to reactions where 100 mole percent excess of methylacetylene was used. The reaction was conducted according to the procedure described in Example 1. The viscosities of the reacting mixtures increased with increasing excess of methylacetylene indicating the direct effect of the latter on the molecular weights of the polythioethers formed.

Molecular weight determinations of the various products indicated that an excess of 20 mole % of methylacetylene resulted in a product having a number average molecular weight of 4742. Products obtained when methylacetylene was present at 50 mole percent and 100 mole percent excess exhibited number average molecular weights of 4286 and 2532, respectively.

EXAMPLE 5

Three-tenths of a mole of trimethylenedithiol (32.4 grams) was reacted for 24 hours with a ten-fold molar excess of methylacetylene (120 grams, 3 gram moles) according to the procedure of Example 1. The resulting product was heated to 210° C. at 0.35 millimeters of mercury in a distillation apparatus to remove volatile materials. The residual product (30 grams, 86 percent yield) had a molecular weight of 842 as determined by low pressure osmometry. The NMR spectrum of the product showed that it had propenyl end groups as shown in the assumed product structure below.

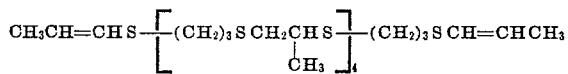

An NMR analysis of the distillate by-product (5 grams) showed that it consisted of a mixture of the following two monoadducts:

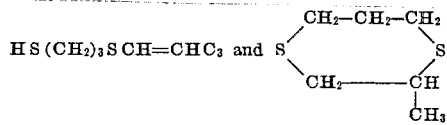

EXAMPLE 6

Into a quartz tube containing 94 grams (1 gram mole) of ethanedithiol was bubbled gaseous acetylene. The reactants were subjected to ultraviolet light irradiation and maintained at a temperature of 17° C. Acetylene addition was continued for five days. The resulting product was then heated to 115° C. at 0.3 millimeters of mercury pressure to remove unreacted dithiol. The residual product, weighing 20.5 grams was believed to be a diadduct of acetylene and ethanedithiol having the assumed structure:

The structure of the above product was confirmed by NMR analysis and thiol end group titration.

EXAMPLE 7

A mixture of 86.4 g. (0.20m) of trimethylenedithiol and 35 g. (0.875m) of methylacetylene contained in a Pyrex pressure tube was irradiated in an aluminum vessel from 7.5 cm distance by a Co⁶⁰ source emitting gamma-rays of about 6000 Curie intensity for 30 minutes. The tube was opened and evacuated to a pressure of 30 mm of mercury to remove the unreacted methyl acetylene. The crude product was then heated at 135° C. under 0.5 mm of mercury pressure to remove all the volatile components. This resulted in the recovery of 107 g. (about 90 percent yield) of the polyadduct in the form of a colorless, viscous liquid polymer. An NMR spectrum of the product indicated that it was virtually free from vinylic unsaturation. The product exhibited a number average molecular weight as determined by the osmotic method of 4330.

EXAMPLE 8

A mixture of 64.8 g. (0.6 m) of trimethylenedithiol and 48 g. (1.2m) of methylacetylene contained in a Pyrex pressure tube was irradiated as in the previous example with Co⁶⁰ plates for 30 minutes. Most of the excess methylacetylene was released on opening the reaction tube. The remaining unreacted material was removed on evacuation to 20 mm of mercury leaving 92.5 g. of residual product. On heating this product at 135° – 138° C. under 0.15 mm of mercury pressure, 5.8 g. of a distillate was obtained. The residue consisted of 85 g. of a colorless somewhat viscous liquid. Its NMR spectrum showed the presence of vinylic unsaturation. Its average molecular weight as determined with the osmosis method was 1170.

EXAMPLE 9

A solution of 54 g. (0.5 m) of trimethylenedithiol and 20.3 g. (0.5075 m) of methylacetylene in 53 g. methyl sulfide contained in a quartz pressure tube was irradiated by ultraviolet light at 16° C. for 3.5 hours. The solvent was then removed at 30 mm of mercury pressure at room temperature. The remaining crude product (69 g.) was heated between 130° – 140° C. for 2 hours to remove the volatiles. The residual product (63 g.) was a colorless liquid of moderate viscosity having a number average molecular weight of 876.

EXAMPLE 10

A mixture of 54 g. (0.5 m) of trimethylenedithiol and 29.7 g. (0.55m) of ethylacetylene was irradiated at 16° C. with an ultraviolet lamp in the usual manner for 18 hours. The tube was opened and evacuated to a pressure of 30 mm of mercury resulting in the loss of 1.7 g. of unreacted ethylacetylene. The remaining crude product was heated at 140° C. under 0.2 mm for 2 hours to remove all the volatiles. The residual product obtained consisted of 73 g. (91 percent) of a colorless, viscous liquid. An NMR spectrum of the product indicated no vinylic unsaturation. An osmotic molecular weight determination of the product gave a value of 3943. The calculated molecular weight of the expected polythioetherdithiol having a degree of polymerization $n$, of 23 is 3916. Calculated elemental composition for $C_{167}H_{336}S_{49}$ ($n = 23$): C, 51.23; H, 8.64; S, 40.13 Found: C, 51.58; H, 8.50; S, 40.03.

EXAMPLE 11

A solution of 27 g. (1.6 m) of xylylene dimercaptan and 8.6 g. (0.215 m) of methylacetylene in 85 g. methyl sulfide, contained in a quartz pressure tube, was irradiated for 3.5 hours at 16° C. with ultraviolet light. The mixture was then washed with a 5 percent aqueous sodium hydroxide solution to remove the unreacted dimercaptan. The methyl sulfide phase was concentrated by distillation in vacuo and heated at 140° C. under 0.5 mm of mercury pressure. The residual polyadduct consisted of 5 g. of a viscous yellow-orange liquid. Its NMR spectrum showed a polyadduct backbone with no unsaturation. This suggested the expected polythioetherdithiol structure. The osmotic molecular weight of the product was found to be 875.

EXAMPLE 12

To a stirred melt. mixture of 34 g. (0.2 m) of p-xylylene dimercaptan and 8.2 g. (0.1 m) of 1-hexyne, 0.75 g. (0.0048 m) of azo-bis-isobutyronitrile was added at 70°C. The mixture was heated to 80° C. where an exothermic reaction was observed. After keeping the mixture at 80° C. for 6 hours, a sample of the resulting crude product was examined by NMR spectral analysis. The spectrum failed to show any unreacted hexyne nor any vinylic monoadduct intermediate present. The position and intensity of the observed NMR peaks agreed with those expected for the adduct having the structural formula:

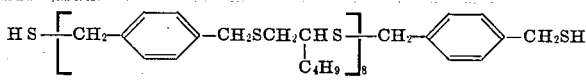

EXAMPLE 13

A mixture of 2.84 g. (0.02 m) of m-benzenedithiol and 1.64 g. (0.02 m) of hexyne was irradiated with ultraviolet light at 16° C. for 2.4 hours. The reaction mixture was sampled periodically for study by NMR. The hydrogen distribution of the samples indicated that 66 percent of the free thiol hydrogens disappeared during the first half hour of reaction. After 24 hours, the conversion was 80 percent on the basis of thiol disappearance. An NMR spectrum also showed 2 vinylic protons for every thiol proton remaining. The rest of the spectrum supported the following assumed structure:

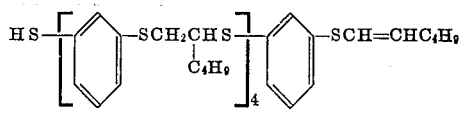

The calculated molecular weight for the above formula is 1122. The osmotic molecular weight determination gave a value of 1034. Calculated elemental composition for $C_{60}H_{80}S_{10}$ ($n = 4$): C, 64.24; H, 7.18; S, 25.58. Found: C, 64.36; H, 7.22; S, 28.94.

EXAMPLE 14

A stirred mixture of 30.5 g. (0.25 m) of tetramethylene dithiol and 14.2 g. (0.275 m) of 2-butyne was irradiated with ultraviolet light at 16° C. for 24 hours. The unconverted reactants and all other volatiles were then removed by distillation. After heating the residual product at 135° C. under 0.1 mm pressure for 2.5 hours, 31.5 g. (71.5 percent yield) of slightly yellow, somewhat viscous, clear liquid polymer was obtained. NMR supported the assumed structure of the polymer repeating unit and showed no vinylic unsaturation. A molecular weight determination by osmometry gave a value of 777. The calculated molecular weight of the assumed polythioetherdithiol product having 4 repeating units is 758. All the data together indicated that on the average, the following reaction took place:

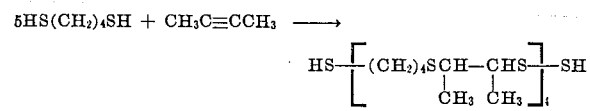

Calculated elemental composition for $C_{31}H_{64}S_{10}$ ($n = 4$): C, 49.16; H, 8.51; S, 42.33. Found: C, 48.97; H, 8.38; S, 42.74.

EXAMPLE 15

A mixture of 54 g. (0.5m) of trimethylenedithiol and 28.5 g. (0.525m) 2-butyne was allowed to stand at room temperature in a quartz pressure tube without any added catalyst. In a few minutes, the temperature of the mixture started to rise and in 10 minutes rose to about 60° C. The mixture then slowly came to ambient temperature and was left to stand for 160 hours. Subsequently, the unreacted starting materials and all other volatile compounds were removed. After 2-½ hours at 135° C., under 0.2 mm mercury pressure, 57 g. (70 percent) of the residual polymer was obtained a clear, colorless, slightly viscous, liquid. An NMR spectrum of the polymer indicated the expected polythioetherdithiol structure. The molecular weight by the osmotic method was found to be 653. The calculated molecular weight for the assumed polythioetherdithiols having an average of 3 and 4 repeating units is 595 and 757, respectively. Consequently, our product can be best described by the following formula:

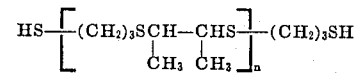

Calculated elemental composition for the polymer having $n = 3$, i.e., a summary formula $C_{24}H_{50}S_8$: C, 48.44; H, 8.46; S, 43.10. Calculated composition for the polymer having $n = 1$, i.e., $C_{31}H_{64}S_{10}$: C, 49.16; H, 8.51; S, 42.33. Found composition: C, 48.97, H, 8.38; S, 42.74. These data show that the average number of units, i.e., $n$ for our product is between 3 and 4.

What is claimed is:

1. A di-terminally functional poly-thioether having the general formula

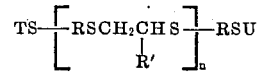

wherein T and U are independently selected from the group consisting of H and

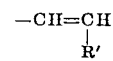

$n$ is about 2 to 1000; R is a $C_2$ to $C_{30}$ divalent organic radical, R' is selected from the group consisting of H, $C_1$—$C_{30}$ alkyl, $C_2$—$C_{30}$ alkenyl, $C_2$ to $C_{30}$ alkynyl, $C_7$—$C_{20}$ aralkyl and mixtures thereof; provided however where at least one of the groups T and U is H, R must not equal

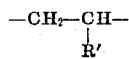

wherein the moieties R and

are incorporated in the polythioether structure in a regular alternating manner.

2. The composition of claim 1 wherein T and U are H.

3. The composition of claim 1 wherein T is H and U is CH=CHR'.

4. The composition of claim 1 wherein R' is methyl and R is ethylene, trimethylene, tetramethylene, phenylene or xylylene, and T and U are H.

5. The composition of claim 1 wherein R is $+C_xH_{2x}+$, R' is

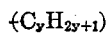

$n$ is 2 to 1000; $x$ is an integer of about 2 to 30; and $y$ is an integer of about 0 to 30.

6. The composition of claim 5 wherein $x$ is an integer of about 3 to about 30 and $y$ is 0.

7. The composition of claim 5 wherein both T and U are H.

8. The polythioether of claim 1 wherein R is $(CH_2)_x$; R' is $—C_yH_{2y+1}—$; $x$ is an integer of about 2 to 30; $y$ is an integer of about 0 to 30 and $n$ is about 2 to 1000.

9. The composition of claim 8 wherein $x$ is an integer of about 2 to about 4 and $y$ is 1.

10. The product prepared by chain extending the composition of claim 1 wherein both T and U are H, by the oxidation of the thiol groups to form disulfides.

11. The product prepared by reacting the product of claim 1 wherein both T and U are H with a compound containing only one oxirane group.

12. The composition prepared by crosslinking or chain extending the composition of claim 2 via addition re-actions of their thiol end groups with di- or polyunsaturated compounds selected from the group consisting of acrylates, vinyl sulfones, and olefinically unsaturated polymers.

13. The product of claim 1 wherein "$n$" is about 2 to about 100.

14. The product of claim 1 wherein "$n$" is about 3 to about 40.

* * * * *